(12) United States Patent
Shimanaka et al.

(10) Patent No.: US 10,995,159 B2
(45) Date of Patent: May 4, 2021

(54) PRODUCTION METHOD FOR POLYMER

(71) Applicant: DAINICHISEIKA COLOR & CHEMICALS MFG. CO., LTD., Tokyo (JP)

(72) Inventors: Hiroyuki Shimanaka, Tokyo (JP); Yoshikazu Murakami, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 16/494,640

(22) PCT Filed: Mar. 26, 2018

(86) PCT No.: PCT/JP2018/012042
§ 371 (c)(1),
(2) Date: Sep. 16, 2019

(87) PCT Pub. No.: WO2018/174297
PCT Pub. Date: Sep. 27, 2018

(65) Prior Publication Data
US 2020/0385496 A1 Dec. 10, 2020

(30) Foreign Application Priority Data

Mar. 24, 2017 (JP) .............................. JP2017-058553

(51) Int. Cl.
| | |
|---|---|
| C08F 220/14 | (2006.01) |
| C08F 293/00 | (2006.01) |
| C08K 3/16 | (2006.01) |
| C08F 2/38 | (2006.01) |
| C08F 2/06 | (2006.01) |
| C08F 265/06 | (2006.01) |
| C08K 5/19 | (2006.01) |
| C08K 5/3415 | (2006.01) |
| C08K 5/521 | (2006.01) |

(52) U.S. Cl.
CPC .............. *C08F 2/38* (2013.01); *C08F 2/06* (2013.01); *C08F 220/14* (2013.01); *C08F 265/06* (2013.01); *C08F 293/005* (2013.01); *C08K 3/16* (2013.01); *C08K 5/19* (2013.01); *C08K 5/3415* (2013.01); *C08K 5/521* (2013.01); *C08F 2438/00* (2013.01)

(58) Field of Classification Search
CPC .. C08F 265/06; C08F 220/14; C08F 293/005; C08F 2438/00; C08K 3/16
See application file for complete search history.

(56) References Cited

U.S. PATENT DOCUMENTS

| | | | |
|---|---|---|---|
| 5,589,484 A | 12/1996 | Venet et al. | |
| 5,945,491 A | 8/1999 | Matyjaxzewski et al. | |
| 6,306,995 B1 * | 10/2001 | Wang | C08F 4/00 526/147 |
| 9,018,325 B2 | 4/2015 | Goto et al. | |

(Continued)

FOREIGN PATENT DOCUMENTS

| | | |
|---|---|---|
| EP | 3590982 | 1/2020 |
| JP | 08-179111 | 7/1996 |

(Continued)

OTHER PUBLICATIONS

Chinese Office Action, issued in the corresponding Chinese patent application No. 201880019756.7, dated Jan. 13, 2020, 13 pages including machine translation (the reference listed in the enclosed Chinese Office Action was previously cited in the IDS filed Sep. 16, 2019.).
International Search Report, issued in the corresponding PCT application No. PCT/JP2018/012042, dated Jun. 19, 2018, 5 pages.
First Chinese Office Action, issued in related Chinese patent application No. 20178014058.3, dated Jul. 6, 2020, 15 pages including machine translation.

(Continued)

*Primary Examiner* — Karuna P Reddy
(74) *Attorney, Agent, or Firm* — Hamre, Schumann, Mueller & Larson, P.C.

(57) ABSTRACT

Provided are: a novel polymerization technique by which a polymer having a controlled molecular weight or molecular weight distribution or a polymer having a desirably regulated, complicated structure can be obtained using commercially available general-purpose materials without using any radical polymerization initiator, or any special material for use in living radical polymerization and without requiring any strict polymerization conditions; a radical polymerization initiation group-containing compound for use in the technique; and a polymer obtained thereby. Specifically, provided are: a method for producing a polymer, the method including a polymerization step of mixing and warming (1) a radically polymerizable monomer, (2) an organic compound having at least one group introduced in a molecule thereof, the group functioning as a polymerization initiation group for the monomer and having a structure represented by formula 1, and (3) a chloride ion-containing and/or bromide ion-containing compound selected from among specific compounds, thereby initiating radical polymerization from the group having the structure, the radical polymerization accompanying a termination reaction; a radical polymerization initiation group-containing compound; and a polymer.

[Formula 1]

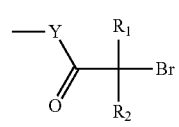

6 Claims, No Drawings

(56) References Cited

U.S. PATENT DOCUMENTS

| | | | |
|---|---|---|---|
| 2002/0173611 A1 | 11/2002 | Percec et al. | |
| 2003/0078353 A1 | 4/2003 | Percec et al. | |
| 2004/0014910 A1 | 1/2004 | Wang | |
| 2007/0004821 A1 | 1/2007 | Bublewitz et al. | |
| 2008/0045686 A1 | 2/2008 | Meagher et al. | |
| 2008/0139759 A1* | 6/2008 | Hamada | C08F 297/02 526/66 |
| 2010/0036055 A1 | 2/2010 | Hayashi et al. | |
| 2011/0112242 A1 | 5/2011 | Shimanaka et al. | |
| 2014/0303334 A1 | 10/2014 | Goto et al. | |
| 2016/0347872 A1* | 12/2016 | Goto | C08F 4/04 |
| 2017/0306073 A1 | 10/2017 | Goto et al. | |

FOREIGN PATENT DOCUMENTS

| | | |
|---|---|---|
| JP | 2000-500516 | 1/2000 |
| JP | 2000-514479 | 10/2000 |
| JP | 2000-515181 | 11/2000 |
| JP | 2003-227921 | 8/2003 |
| JP | 2005-213443 | 8/2005 |
| JP | 2007-277533 | 10/2007 |
| JP | 2009-298989 | 12/2009 |
| JP | 2011-246511 | 12/2011 |
| JP | 2013-072069 | 4/2013 |
| JP | 2015-199834 | 11/2015 |
| JP | 2015-227407 | 12/2015 |
| JP | 2016-053097 | 4/2016 |
| KR | 10-2014-0054325 | 5/2014 |
| WO | 1997/018247 | 5/1997 |
| WO | 1998/01478 | 1/1998 |
| WO | 1999/005099 | 2/1999 |
| WO | 2013/027419 | 2/2013 |
| WO | 2015/122404 | 8/2015 |
| WO | WO-2015122404 A1 * | 8/2015 |

OTHER PUBLICATIONS

International Search Report, issued in the corresponding PCT application No. PCT/JP2017/006459, dated May 23, 2017, 5 pages.
Japanese Office Action issued in the corresponding Japanese Patent application No. 2016-202901, dated Sep. 12, 2017, 6 pages (including machine translation).
Korean Office Action, issued in the corresponding Korean Patent application No. 10-2018-7027550, dated May 17, 2019, 14 pages (including machine translation).
Canadian Office Action, issued in the corresponding Canadian Patent application No. 3,011,899, dated Jul. 29, 2019, 4 pages.
Extended European Search Report, issued in the corresponding European Patent application No. 17759753.1, dated Sep. 23, 2019, 10 pages.
Wan Zheng, "Development of well-defined inorganic and polymer nanostructures for bio-nanoengeneering", Thesis submitted to the Faculty and the Board of Trustees of the Colorado School of Mines, Dec. 31, 2015, 188 pages.
Ohno et al., "A Versatile Method of Initiator Fixation for Surface-Initialed Living Radical Polymerization of Polymeric Substrates", Macromolecules, 2010, vol. 43, No. 13, Jul. 13, 2010, pp. 5569-5574.
Taiwan Office Action, issued in the corresponding Taiwan patent application No. 10920193700, dated Mar. 2, 2020, 4 pages.
Second Canadian Office Action, issued in the corresponding Canadian Patent application No. 3,011,899, dated Mar. 16, 2020, 4 pages.
Moad et al., Living free radical polymerization with reversible addition—fragmentation chain transfer (the life of RAFT), Polymer International, vol. 49, issue 9, Sep. 2000, pp. 993-1001.
Extended European Search Report, issued in the corresponding European patent application No. 18771677.4, dated Dec. 14, 2020, 7 pages.
Office Action issued for Australian Patent Application No. 2018239715, dated Nov. 17, 2020, 3 pages.
Office Action issued for Taiwanese Patent Application No. 107110303, dated Nov. 20, 2020, 3 pages.

* cited by examiner

PRODUCTION METHOD FOR POLYMER

TECHNICAL FIELD

The present invention relates to a novel method for producing a polymer using a radically polymerizable monomer having an unsaturated bond, and in detail, relates to: a novel method for producing a polymer, by which radical polymerization accompanying a termination reaction can be initiated by only using simple, commercially available materials; a radical polymerization initiation group-containing compound; and a polymer obtained by using the radical polymerization initiation group-containing compound. In more detail, the present invention relates to a technique: that enables a polymerization method which is advantageous in terms of costs and which is industrially useful because by the method, a polymer can easily be obtained by only performing mixing and warming using simple, commercially available materials without using a radical polymerization initiator, or a special material or a metal-based catalyst for use in living radical polymerization; that enables providing a radical polymerization initiation group-containing compound which enables realization of the polymerization method; and that enables providing a polymer having a uniform molecular weight and having a structure controlled into any of desired various states, which has been difficult in conventional radical polymerization.

BACKGROUND ART

Conventionally, a polymer obtained by polymerizing a radically polymerizable monomer (hereinafter, sometimes simply referred to as "monomer") having an unsaturated bond, such as a vinyl group, a vinylidene group, or a vinylene group, has been obtained by radical polymerization, ionic polymerization, or the like, has a high versatility, and therefore has been used in various fields. Particularly, with respect to the radical polymerization, a polymer is obtained by thermal polymerization using an azo-based radical polymerization initiator or a peroxide-based polymerization initiator that is necessary for producing radicals, or by photopolymerization using a photo radical polymerization initiator.

On the other hand, in these types of radical polymerization, there is a problem that polymerization is terminated due to: very short lifetime of the radicals; a coupling reaction between radicals; and a disproportionation reaction in which a radical abstracts hydrogen from others and disappears. By this termination of the reaction, molecular weight has not been made uniform, so that a polymer having a controlled structure, such as, for example, a block copolymer, has not been able to be obtained. Against this problem, it is living radical polymerization that has been invented in order to control the molecular weight and structure of a polymer, and various methods have been studied (Patent Literatures 1 to 5).

CITATION LIST

Patent Literature

Patent Literature 1: National Publication of International Patent Application No. 2000-500516
Patent Literature 2: National Publication of International Patent Application No. 2000-514479
Patent Literature 3: National Publication of International Patent Application No. 2000-515181
Patent Literature 4: International Publication No. WO 1999/05099
Patent Literature 5: Japanese Patent Laid-Open No. 2007-277533

SUMMARY OF INVENTION

Technical Problem

As described above, the radical polymerization method using a radical polymerization initiator is useful, but polymers having a complicated structure, such as, for example, a block copolymer, a graft copolymer, and a star polymer (star-shaped polymer), cannot be obtained by a method in which a monomer is subjected to usual radical polymerization. In contrast, polymers having a complicated structure, as described above, can be obtained by living radical polymerization, but in that case, there are problems described below. That is, in the living radical polymerization, a special compound is used, or a metal catalyst is used, and therefore the compound and the catalyst need to be removed, so that a plurality of industrially complicated steps are necessary, and moreover, there is a need to control the polymerization conditions strictly, such as necessity to purify the monomers to be used and necessity to conduct living radical polymerization in a nitrogen atmosphere.

Accordingly, an object of the present invention is to provide: an industrially useful, novel method for producing a polymer, by which a polymer having a controlled molecular weight or a molecular weight distribution or a polymer having a complicated structure, such as a block copolymer, a graft polymer, or a star polymer, can simply be obtained as a polymer controlled into a desired state using general-purpose, commercially available materials as many as possible without using a radical polymerization initiator, or a special material or a metal-based catalyst for use in the living radical polymerization by a simple method without a need for strict polymerization conditions; and a radical polymerization initiation group-containing compound that enables the production method. In addition, another object of the present invention is to realize a technique that can provide a useful polymer having a structure controlled into a desired state in an industrially stable manner by finding out a method for producing such a polymer.

Solution to Problem

The present inventors have made diligent studies in order to solve the above-described problems to find out a novel polymerization method by which a polymer can be obtained by using a radically polymerizable monomer of (1), an organic compound of (2) having a group introduced therein, the group functioning as a polymerization initiation group and having a particular structure specified in the present invention, and a chloride ion (chlorine ion)-containing, bromide ion (bromine ion)-containing compound of (3) selected from particular compounds, and only mixing and warming (heating) these materials, thereby allowing polymerization the radically polymerizable monomer of (1) to progress easily from a polymerization initiation group constituting the organic compound of (2), and thus the present invention has been achieved.

The present inventors have further found that by using, in addition to the above-described constitution, a compound of (4) having a group selected from the group consisting of an imide group, an N-bromoimide group, an N-iodoimide group, and an organic base, the structure and molecular weight of a resultant polymer can be controlled extremely simply. According to the novel polymerization method which the present inventors have found, it is realized that by only mixing and warming the above-described materials of (1) to (3) or materials of (1) to (4), a polymer is obtained simply, and further, a polymer having a form and characteristics each controlled into a desired state is obtained without using a radical polymerization initiator that has been used in a conventional polymerization method, or a special material or a metal-based catalyst for use in the living radical polymerization. It is to be noted that "warming" specified in the present invention means making the temperature room temperature or higher, and the temperature may be, for example, 40° C. or higher, and may be determined based on the balance with the polymerization speed.

That is, the present invention provides a method for producing a polymer, the method comprising a polymerization step of mixing and warming: (1) a radically polymerizable monomer having an unsaturated bond; (2) an organic compound having at least one group introduced in a molecule thereof, the group functioning as a radical polymerization initiation group for the monomer and having a structure represented by the following formula 1; and (3) at least one chloride ion-containing and/or bromide ion-containing compound selected from the group consisting of a metal chloride, a metal bromide, a quaternary ammonium chloride, a quaternary ammonium bromide, a quaternary phosphonium chloride, and a quaternary phosphonium bromide, thereby initiating radical polymerization of the monomer of (1) from the group having the structure, the radical polymerization accompanying a termination reaction.

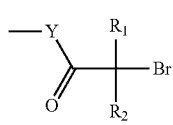

[Formula 1]

wherein $R_1$ represents H, an alkyl group, an acyl group, or an aryl group, $R_2$ represents an alkyl group or an aryl group, and Y represents O or NH.

Preferred embodiments of the above-described method for producing a polymer include the following embodiments. The preferred embodiments include: anyone of an azo-based radical polymerization initiator, a peroxide-based radical polymerization initiator, and a photo radical polymerization initiator is not used in the polymerization step; (4) a compound having a group selected from the group consisting of an imide group, an N-bromoimide group, an N-iodoimide group, and an organic base is further used in the polymerization step; an organic solvent is further used in the polymerization step; the organic solvent is at least one selected from the group consisting of an alcohol-based solvent, a glycol-based solvent, an amide-based solvent, a urea-based solvent, a sulfoxide-based solvent, and an ionic liquid; (1) the radically polymerizable monomer having an unsaturated bond is a methacrylic acid-based monomer; and the group having a structure represented by the formula 1 is a group having a structure represented by the following formula 2.

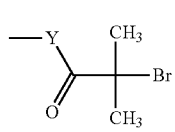

[Formula 2]

wherein Y represents O or NH.

The present invention provides as another embodiment a radical polymerization initiation group-containing compound for performing radical polymerization of a radically polymerizable monomer having an unsaturated bond without using any one of an azo-based radical polymerization initiator, a peroxide-based radical polymerization initiator, and a photo radical polymerization initiator, the radical polymerization accompanying a termination reaction, wherein the radical polymerization initiation group-containing compound is an organic body having at least one group introduced in a molecule thereof, the group having a structure represented by the following formula 1 and being constituted so as to exhibit a function as a radical polymerization initiation group for the radically polymerizable monomer by being used together with at least one chloride ion-containing and/or bromide ion-containing compound selected from the group consisting of a metal chloride, a metal bromide, a quaternary ammonium chloride, a quaternary ammonium bromide, a quaternary phosphonium chloride, and a quaternary phosphonium bromide.

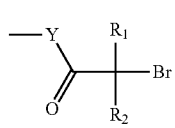

[Formula 1]

wherein $R_1$ represents H, an alkyl group, an acyl group, or an aryl group, $R_2$ represents an alkyl group or an aryl group, and Y represents O or NH.

Preferred embodiments of the radical polymerization initiation group-containing compound according to the present invention include that the group having a structure represented by the formula 1 is a group having a structure represented by the following formula 2.

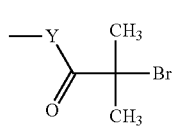

[Formula 2]

wherein Y represents O or NH.

Preferred embodiments of the radical polymerization initiation group-containing compound according to any one of those described above include those described below. That is, the preferred embodiments include: the organic body is an organic body having two or more groups introduced in a molecule thereof, the groups each represented by the formula 1; the organic body is a polymer having two or more groups introduced in a molecule thereof, the groups each represented by the formula 1 or 2; the organic body is a compound having three or more groups introduced in a molecule thereof, the groups each represented by the formula 1 or 2; the organic body is a vinyl polymer having three or more groups introduced in a molecule thereof, the groups each represented by the formula 1 or 2; and the organic body is a copolymer of a monomer having at least one group introduced in a molecule thereof, the group having a structure represented by the formula 1 or 2, and a monomer having a reactive group capable of being bonded to a surface of a base material.

The present invention provides as a still another embodiment a polymer constituted by mixing and warming: a radically polymerizable monomer having an unsaturated bond of (1); the radical polymerization initiation group-containing compound of (2) having at least one group introduced in a molecule thereof, the group having a structure represented by the following formula 1; and at least one chloride ion-containing and/or bromide ion-containing compound of (3) selected from the group consisting of a metal chloride, a metal bromide, a quaternary ammonium chloride, a quaternary ammonium bromide, a quaternary phosphonium chloride, and a quaternary phosphonium bromide, thereby subjecting the radically polymerizable monomer having an unsaturated bond of (1) to radical polymerization from the radical polymerization initiation group for the radically polymerizable monomer, the radical polymerization initiation group introduced in the initiation group-containing compound of (2).

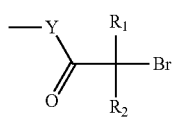

[Formula 1]

wherein $R_1$ represents H, an alkyl group, an acyl group, or an aryl group, $R_2$ represents an alkyl group or an aryl group, and Y represents O or NH.

Preferred embodiments of the polymer according to the present invention include that the radical polymerization initiation group-containing compound of (2) is a polymer having at least 2-(2-bromoisobutyryloxy)ethyl methacrylate as a constituent.

The present invention relates to product invention, and on the other hand, specifies the product invention by a production process of "mixing and warming the materials of (1) to (3), thereby subjecting the radically polymerizable monomer having an unsaturated bond of (1) to radical polymerization from a radical polymerization initiation group for the radically polymerizable monomer, the radical polymerization initiation group introduced in the compound of (2)". The reason is that the polymer according to the present invention is a polymer having a structure in which the group having a particular structure in the radical polymerization initiation group-containing compound of (2) is made to function as a polymerization initiation group by the chloride ion-containing and/or bromide ion-containing compound of (3) to subject the monomer of (1) to radical polymerization from the polymerization initiation group, and a polymer composed of the monomer of (1) is thereby grown from, as the starting point, the particular group introduced in the organic compound of (2), and the polymer according to the present invention cannot be specified directly from the structure or the properties thereof, and can be specified for the first time by the process (production method) for obtaining the polymer. That a polymer is an aggregate (mixture) of various polymers having a different molecular weight is a well-known fact in the technical field, and specifying the structure and physical properties of each polymer contained in the aggregate (mixture) is impossible and is not realistic at all.

Advantageous Effects of Invention

According to the present invention, there is provided an extremely simple method for producing a polymer, in which general-purpose materials are used and by which a polymer is obtained by only mixing and warming (heating): an organic compound of (2), which is versatile and can be made into various forms, having a group functioning as a polymerization initiation group for a monomer and having a particular structure; a radically polymerizable monomer of (1); and a particular chloride ion (chlorine ion)-containing and/or bromide ion (bromine ion)-containing compound of (3) (hereinafter, written as Cl/Br ion-containing compound of (3)) selected from particular compounds, thereby initiating radical polymerization of the monomer of (1), the radical polymerization accompanying a termination reaction, from the group having the structure, the group contained in the organic compound of (2). The Cl/Br ion-containing compound of (3) is a commercially available, general-purpose material, which can easily be available, can take various structures, has no coloration as can be seen in an iodine ion, and further, these materials are stable against heat and light, and are excellent as materials to be used industrially. In addition, according to the production method of the present invention, constitution such that the compound of (4) having an organic base or an imide group is further added to a polymerization system using the above-described materials of (1) to (3) enables more easily obtaining a polymer having a molecular weight and a structure controlled into desired states. According to the present invention, by skillfully utilizing the above-described simple, excellent production method, a polymer having a complicated structure, for which industrial production has not been able to be realized because it is difficult and complicated, such as, for example, an ABA block copolymer, a star polymer, a graft copolymer, a surface-grafted polymer, and a heterogeneous graft/block/multi-branched polymer, can be industrially produced.

The number of types of materials to be used for production is reduced in the method for producing a polymer according to the present invention, and therefore the method for producing a polymer according to the present invention is environmentally useful and advantageous in terms of costs. Further, in the method for producing a polymer according to the present invention, there is no need to use an explosive compound, such as an azo-based polymerization initiator or a peroxide-based polymerization initiator which has conventionally been used, and therefore the method for producing a polymer according to the present invention is highly safety, and besides, there is no need to freeze or refrigerate the materials, which is in contrast to the cases of those initiators. In addition, a compound in which a bromine atom is bonded to a polymerization initiation group is used in the production method according to the present invention, so that the bond is relatively stable, and therefore a polymerization initiation compound having an iodine atom, which is used in living radical polymerization but is decomposed by heat or light although it is very useful, does not have to be used, so that the production method according to the present invention has a great merit in storage of materials, and the like. These facts mean to have extremely high practical values in the method for producing a polymer.

The method for producing a polymer, by which the above-described various excellent effects are obtained, has been first enabled by the radical polymerization initiation group-containing compound according to the present invention. The radical polymerization initiation group-containing compound according to the present invention is a general-purpose compound that is not particularly limited except that it has at least one group introduced therein, the group having a simple structure specified by the present invention. Specifically, the radical polymerization initiation group-containing compound according to the present invention can be made into a general-purpose low-molecular-weight compound, polymer, or monomer and used by appropriately changing the number of groups to be introduced and the form of an organic compound in which the group or groups are introduced. Therefore, by using the radical polymerization initiation group-containing compound according to the present invention, simply and economically obtaining various polymers, such as an ABA block copolymer, a star polymer, a bottlebrush polymer, a concentrated polymer brush, a heterogeneous graft/block/multi-branched polymer, designed so as to have a desired structure can be realized. Further, the radical polymerization initiation group-containing compound according to the present invention is also extremely industrially useful in that the radical polymerization initiation group-containing compound according to the present invention can be made to function as a polymerization initiation group by simple operation of being mixed and warmed with the Cl/Br ion-containing compound of (3) selected from the general-purpose compounds specified in the present invention.

DESCRIPTION OF EMBODIMENTS

Next, the present invention will be described in more detail giving preferred embodiments. The present inventors have conducted diligent studies in order to achieve the objects of the present invention to find a method for producing a polymer, by which a polymer having a complicated structure can easily be obtained using simple, commercially available materials without using conventional materials having a problem in safety and in a storage property, which is industrially extremely useful, and which has totally new constitution that has never existed in the past, and thus the present inventors have achieved the present invention. According to the production method of the present invention, by only extremely simple operation of using a radically polymerizable monomer of (1), an organic compound of (2) having a group introduced therein, the group functioning as a polymerization initiation group and having a particular structure specified in the present invention, and a Cl/Br ion-containing compound of (3), and mixing and warming (heating) these components, radical polymerization of the radically polymerizable monomer of (1) is easily initiated from the group having a particular structure and progresses, the radical polymerization accompanying a termination reaction, so that the polymer can be obtained.

The method for producing a polymer according to the present invention is characterized by including a polymerization step of mixing and warming: the radically polymerizable monomer having an unsaturated bond of (1); the organic compound of (2) having at least one group introduced in a molecule thereof, the group functioning as a polymerization initiation group for the monomer and having a structure represented by the following formula 1; and at least one Cl/Br ion-containing compound of (3) selected from the group consisting of a metal chloride, a metal bromide, a quaternary ammonium chloride, a quaternary ammonium bromide, a quaternary phosphonium chloride, and a quaternary phosphonium bromide, thereby initiating radical polymerization of the radically polymerizable monomer of (1) from the group having the structure, the radical polymerization accompanying a termination reaction.

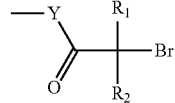

[Formula 1]

wherein $R_1$ represents H, an alkyl group, an acyl group, or an aryl group, $R_2$ represents an alkyl group or an aryl group, and Y represents O or NH.

Hereinafter, respective materials constituting the present invention will be described in detail.

[(1) Radically Polymerizable Monomer Having Unsaturated Bond]

In the method for producing a polymer according to the present invention, (1) the radically polymerizable monomer having an unsaturated bond (hereinafter, written as "monomer of (1)") which is a component for forming the polymer is used as an essential component. Examples of the monomer of (1) include conventionally known monomers having an unsaturated bond, such as monomers having a vinyl group, a vinylidene group, or a vinylene group. That is, any of the conventionally known, radically polymerizable monomers as described below can be used and is not particularly limited.

Examples of the monomer of (1) include monomers such as styrene, vinyl toluene, vinyl hydroxybenzene, chloromethyl styrene, vinyl naphthalene, vinyl biphenyl, vinyl ethylbenzene, vinyl dimethylbenzene, α-methylstyrene, ethylene, propylene, isoprene, butene, butadiene, 1-hexene, cyclohexene, cyclodecene, dichloroethylene, chloroethylene, fluoroethylene, tetrafluoroethylene, acrylonitrile, methacrylonitrile, vinyl acetate, vinyl propionate, isocyanatodimethylmethane isopropenylbenzene, phenylmaleimide, cyclohexyl maleimide, hydroxymethylstyrene, styrene sulfonic acid, vinyl sulfonic acid, vinylamine, allylamine, aminostyrene, vinylmethylamine, allylmethylamine, methylaminostyrene, vinylpyridine, vinyl imidazole, vinylbenzotriazole, vinyl carbazole, dimethylaminostyrene, diallylmethylamine, trimethylammonium styrene chloride, dimethyl lauryl amino styrene chloride, vinyl methyl pyridinyl chloride, and diallyl dimethyl ammonium chloride.

Examples of the monomer of (1) further include (meth) acrylate-based monomers and (meth) acrylamide-based monomers as described below. Specific examples thereof include aliphatic alkyl (meth)acrylates, alicyclic alkyl (meth)acrylates, and aromatic alkyl (meth)acrylates such as methyl (meth)acrylate, ethyl (meth)acrylate, propyl (meth)acrylate, isopropyl (meth)acrylate, butyl (meth) acrylate, 2-methylpropane (meth) acrylate, t-butyl (meth)acrylate, pentyl (meth)acrylate, hexyl (meth)acrylate, octyl (meth) acrylate, 2-ethylhexyl (meth)acrylate, nonyl (meth)acrylate, decyl (meth) acrylate, isodecyl (meth)acrylate, lauryl (meth) acrylate, tetradecyl (meth)acrylate, octadecyl (meth)acrylate, behenyl (meth)acrylate, isostearyl (meth) acrylate, cyclohexyl (meth) acrylate, t-butylcyclohexylmethyl (meth) acrylate, isobornyl (meth) acrylate, trimethylcyclohexyl (meth) acrylate, cyclodecyl (meth)acrylate, cyclodecylmethyl (meth)acrylate, benzyl (meth) acrylate, t-butylbenzotriazole phenylethyl (meth)acrylate, phenyl (meth)acrylate, naphthyl (meth)acrylate, and allyl (meth)acrylate.

Examples of the monomer of (1) further include 2-hydroxyethyl (meth) acrylate, 2-hydroxypropyl (meth) acrylate, 3-hydroxypropyl (meth) acrylate, 4-hydroxybutyl (meth)acrylate, 6-hydroxyhexyl (meth) acrylate, and alkylene glycol mono(meth)acrylates, such as cyclohexanedimethanolmono(meth)acrylate and cyclohexanediol mono(meth)acrylate, each being a monomer having a hydroxy group.

Examples of the monomer of (1) further include polyalkylene glycol mono(meth)acrylates, such as poly (n=2 or more, the same applies hereinafter)ethylene glycol mono (meth)acrylate, polypropylene glycol mono(meth)acrylate, polytetramethylene glycol mono(meth)acrylate, a mono (meth)acrylate of a random copolymer of a mono- or polyethylene glycol and a mono- or polypropylene glycol, and a mono(meth)acrylate of a block copolymer of a mono- or polyethylene glycol and a mono- or polypropylene glycol, each being a monomer having a glycol group.

Examples of the monomer of (1) further include mono (meth)acrylates of a (polyalkylene)glycol monoalkyl, alkylene, or alkyne ether or ester, such as (poly)ethylene glycol monomethyl ether (meth)acrylate, (poly)ethylene glycol monooctyl ether (meth)acrylate, (poly)ethylene glycol monolauryl ether (meth)acrylate, (poly)ethylene glycol monostearyl ether (meth)acrylate, (poly)ethylene glycol monooleyl ether (meth)acrylate, (poly)ethylene glycol monostearic acid ester (meth)acrylate, (poly)ethylene glycol monononylphenyl ether (meth)acrylate, (poly)propylene glycol monomethyl ether (meth)acrylate, (poly)propylene glycol monoethyl ether (meth)acrylate, (poly)propylene glycol monooctyl ether (meth)acrylate, (poly)propylene glycol monolauryl ether (meth)acrylate, and (poly)ethylene glycol (poly)propylene glycol monomethyl ether (meth)acrylate.

Monomers as described below, each being a monomer having an acid group (carboxyl group, sulfonic acid, or phosphoric acid), can also be used. Examples of the monomer having a carboxyl group include acrylic acid, methacrylic acid, maleic acid, acrylic acid dimer, itaconic acid, fumaric acid, crotonic acid, a monomer obtained by reacting maleic anhydride, succinic anhydride, phthalic anhydride, or the like with a hydroxyalkyl (meth)acrylate, such as 2-hydroxyethyl (meth)acrylate or 4-hydroxybutyl (meth)acylate, and a maleic acid or itaconic acid monoester-based monomer. In addition, examples of the monomer having a sulfonic acid group include dimethylpropyl sulfonic acid (meth) acrylamide, ethyl sulfonate (meth)acrylate, and ethyl sulfonate (meth)acrylamide. Examples of the monomer having a phosphoric acid group include (di, tri)methacryloyloxyethyl phosphoric acid esters.

Examples of the monomer of (1) further include glycidyl (meth)acrylate, tetrahydrofurfuryl (meth)acrylate, oxetanylmethyl (meth)acrylate, morpholino (meth)acrylate, methylmorpholino (meth) acrylate, and methylmorpholinoethyl (meth)acylate, each being an oxygen atom-containing monomer.

Examples of the monomer of (1) further include those described below, each being a monomer having an amino group. Examples of the monomer having a primary amino group include 2-aminoethyl (meth)acrylate and 2-aminopropyl (meth)acrylamide, and examples of the monomer having a secondary amino group include t-butylaminoethyl (meth) acrylate, tetramethyl piperidyl (meth)acylate, and t-butylaminopropyl (meth)acrylamide. Examples of the monomer having a tertiary amino group include dimethylaminoethyl (meth)acylate, diethylaminoethyl (meth)acylate, pentamethyl piperidyl (meth)acylate, N-ethylmorpholino (meth) acylate, and dimethylpropyl (meth)acrylamide. Examples of the monomer having a quaternary amino group include trimethylaminoethyl (meth)acrylate chloride, diethylmethylaminoethyl (meth)acrylate chloride, benzyl dimethylaminoethyl (meth)acrylate chloride, and trimethylaminoethyl (meth)acrylate methylsulfate. In addition, examples of the monomer of (I) further include a monomer obtained by reacting a primary or secondary amine with a glycidyl group-containing monomer such as glycidyl (meth)acrylate described previously.

Example of the monomer of (1) further include: (meth) acryloyloxyethyl isocyanate, (meth)acryloyloxyethoxyethyl isocyanate, and a blocked isocyanate-containing (meth) acrylate in which isocyanate of (meth)acryloyloxyethyl isocyanate or (meth)acryloyloxyethoxyethyl isocyanate is blocked by caprolactone or the like; ethylene imino ethyl (meth)acrylate; amide-based monomers such as (meth)acrylamide, N,N-dimethyl(meth)acrylamide, N,N-diethyl(meth) acrylamide, N-methylol(meth)acrylamide and N-butoxymethyl(meth)acrylamide; N-vinylpyrrolidone, N-vinylacetamide, and N-vinylcaprolactam, each being a nitrogen atom-containing monomer.

Besides, examples of the monomer that can be used in the present invention include those described below. A polyester-based mono(meth)acrylic acid ester obtained by subjecting a lactone, such as ε-caprolactone or γ-butyrolactone, to ring-opening polymerization using, as an initiator, the (poly) alkylene glycol mono(meth)acrylic acid ester described previously, such as (meth)acryloyloxyethyl mono- or polycaprolactone; an ester-based (meth)acrylate obtained by reacting a dibasic acid with the (poly)alkylene glycol mono (meth)acrylic acid ester described previously, such as 2-(meth)acryloyloxyethyl-2-hydroxyethyl phthalate or 2-(meth)acryloyloxyethyl-2-hydroxyethyl succinate, to make a half ester, and then reacting an alcohol or an alkylene glycol with the other carboxylic acid of the half ester; further, mono(meth)acrylates of a multifunctional, hydroxy group-containing compound having two or more hydroxy groups, such as glycerol mono(meth)acrylate and dimethylolpropane mono(meth)acrylate; halogen atom-containing (meth)acrylates such as 3-chloro-2-hydroxypropyl (meth) acrylate, octafluorooctyl (meth)acrylate, and tetrafluoroethyl (meth)acrylate; silicon atom-containing monomers having a trimethylsilyl group or a dimethyl silicone chain; monomers absorbing ultraviolet rays, such as 2-(4-benzoxy-3-hydroxyphenoxy)ethyl (meth) acrylate, and 2-(2'-hydroxy-5-(meth) acryloyloxyethylphenyl)-2H-benzotriazole; and α-hydroxymethyl-substituted acrylates such as ethyl-α-hydroxymethyl acrylate.

Furthermore, a cyclic vinyl-based monomer can also be used, and a monomer having two or more addition-polymerizable groups can also be used as necessary. Examples thereof include divinylbenzene, ethylene glycol di(meth) acrylate, diethylene glycol di(meth)acrylate, a (meth)acrylic acid ester of a polyalkylene glycol adduct of trimethylolpropane, and a (meth)acrylic acid ester of an alkylene oxide adduct of bisphenol A. In the present invention, at least one of the above-described radically polymerizable monomers each having an unsaturated bond can be used. The present invention intends to simply obtain a straight-chain polymer, an AB block copolymer, an ABA block copolymer, a star polymer, a bottlebrush polymer, a concentrated polymer brush, a heterogeneous graft/block/multi-branched polymer, and therefore two or more of the radically polymerizable monomers having an unsaturated bond are usually used.

In the present invention, methacrylic acid-based monomers are particularly preferably used among the above-described usable monomers from the reasons as described below. It is to be noted that the "methacrylic acid-based monomers" in the present invention refer to: methacrylic acid; and methacrylates each being a methacrylic acid ester. The methacrylic acid-based monomers have a relatively high glass transition point in many cases, in addition, have a tertiary ester group, and therefore have strong resistance to water and hydrolysis. Further, carbon to which chlorine or bromine is bonded, the carbon obtained by the polymerization process in the novel polymerization method that has been realized by the present invention, is tertiary, and a radical of the tertiary carbon is relatively stable, and therefore chlorine or bromine easily detached as a radical, and thus the methacrylic acid-based monomers are best suited for the mechanism of the polymerization method that has been realized by the present invention.

[(2) Organic Compound Having at Least One Group in Molecule Thereof, the Group Having Structure Represented by Formula 1]

Next, the organic compound of (2) that characterizes the present invention and has at least one group introduced in the molecule thereof, the group functioning as a polymerization initiation group for the monomer of (1) and represented by the following formula 1 (hereinafter, sometimes simply written as "organic compound of (2)") will be described. According to studies conducted by the present inventors, when the monomer of (1) and the Cl/Br ion-containing compound of (3), which will be described later, are mixed and warmed in the presence of the group having a structure represented by the following formula 1 (hereinafter, sometimes written as "group of formula 1" or "polymerization initiation group"), radical polymerization of the monomer of (1), the radical polymerization accompanying a termination reaction, is initiated from the peculiar "group of formula 1" that characterizes the present invention, and as a result, various polymers each having a controlled structure can be obtained.

With respect to the organic compound of (2) (radical polymerization initiation group-containing compound according to the present invention) that is used in the present invention and characterizes the present invention, a structure as shown below may be introduced in the molecule, and this structure functions as a polymerization initiation group for the monomer of (1). The organic compound of (2), as compared to an azo-based polymerization initiator and a peroxide-based polymerization initiator which have conventionally been used for radical polymerization, has a higher level of safety, and further, there is no need to freeze or refrigerate the materials, which is in contrast to the cases of conventional initiators. In addition, a compound having a bromine atom bonded in the structure thereof is used, and therefore the bond is relatively stable, so that the compound, which is different from a polymerization initiation compound in which an iodine atom is bonded and which is used for living radical polymerization, does not decompose due to heat or light.

[Formula 1]

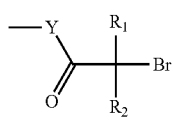

wherein $R_1$ represents H, an alkyl group, an acyl group, or an aryl group, $R_2$ represents an alkyl group or an aryl group, and Y represents O or NH.

The "group of formula 1" specified in the present invention has a bromine atom (also referred to as bromo) bonded in the structure thereof and has a characteristic that this bromine atom is a group that can be eliminated or replaced reactively, and further at least one electron-withdrawing group, such as an ester group, an amide group, a cyano group, a carboxy group, or an aryl group, is bonded to the carbon to which this bromine atom is bonded. In the present invention, any of the organic compounds can be used as long as the organic compounds are those having at least one of such groups introduced in the molecule thereof. As the organic compound of (2), an organic compound in any one of the forms of, for example, a low-molecular-weight compound, a monomer, a polymer, and the like can be used. Hereinafter, the "group of formula 1" will be described.

Specific examples of the "group of formula 1" specified in the present invention are given below, but the "group of formula 1" is not limited to those described below. Examples of the "group of formula 1" include those having an ester bond or an amide bond in the structure thereof, as shown below. In the organic compound that constitutes the present invention and has at least one "group of formula 1" introduced in the molecule thereof, the bromine atom (Br) is bonded through an ester bond or an amide bond, as shown below.

Examples of the "group of formula 1" include groups each having an ester bond or an amide group of β-bromo alkanoic acids, as described below.

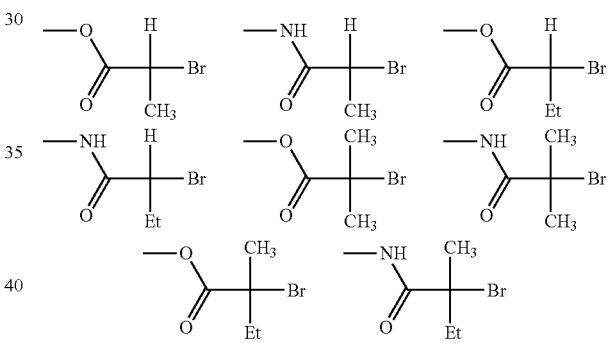

Examples of the "group of formula 1" include groups each having an ester bond or an amide group of β-chloro or bromo aryl-substituted alkanoic acids, as described below.

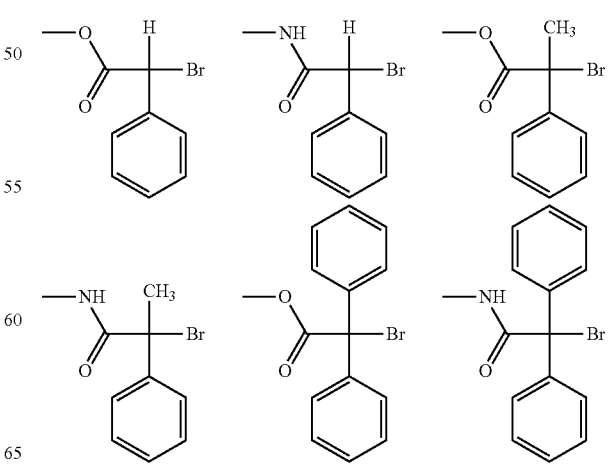

Examples of the "group of formula 1" include groups each having an ester bond or an amide bond of bromo-substituted acetoalkanoic acids, as described below.

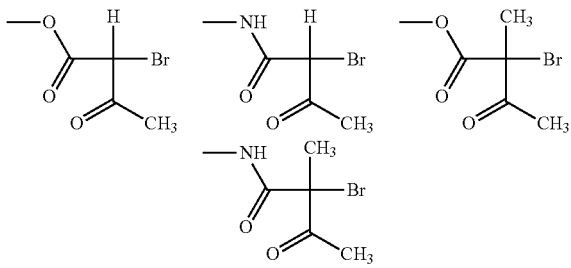

Introduction of the "group of formula 1" as exemplified above into an organic compound can be conducted by an arbitrary method, and the method is not particularly limited. For example, when the "group of formula 1" is introduced, the organic compound having the "group of formula 1" introduced therein can be obtained by esterification or amidation of a compound containing a corresponding carboxylic acid group. The organic compound having the "group of formula 1" introduced therein can also be obtained by reacting a compound having the "group of formula 1" with a compound having an epoxy group. In addition, the "group of formula 1" may be introduced by using a compound in which a hydroxy group is bonded to a group to which bromine in the structure of the "group of formula 1" is bonded and replacing the hydroxy group part of the compound with bromine using phosphorus tribromide or hydrobromic acid. Further, bromo may be introduced by using a compound having an unsaturated bond at the C—Br part in the structure of the "group of formula 1" and adding hydrogen bromide to the unsaturated bond. The above-described methods are each shown as an example, the method of introducing the "group of formula 1" into an organic compound is not particularly limited to these methods, and conventionally known compounds and organic reactions are used.

In the organic compound of (2) that characterizes the present invention, at least one "group of formula 1" described above may be introduced, and any form of such organic compounds is included. According to studies conducted by the present inventors, an organic compound having a group introduced therein, the group having a structure represented by the following formula 2, (hereinafter, also referred to as "group of formula 2") is preferably used because among the "groups of formula 1", the group having a structure represented by the following formula 2 gives a particularly high polymerization initiation reaction speed and can easily be synthesized with commercially available compounds.

[Formula 2]

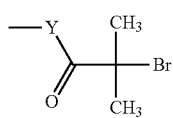

wherein Y represents O or NH.

The "group of formula 2" can be obtained with conventionally known materials and by conventionally known methods, an organic compound in any of various forms, the organic compound having the "group of formula 2" introduced therein and corresponding to the organic compound of (2), can also simply be obtained, and the method for obtaining the organic compound is not particularly limited. One example that the organic compound having the "group of formula 2" introduced therein can easily be synthesized is described below. The organic compound having the "group of formula 2" introduced therein is obtained by using a 2-bromoisobutyric acid-based compound as a starting material and, as an organic compound in which the "group of formula 2" is intended to be introduced, an organic compound having a group that can react with a carboxy group of the 2-bromoisobutyric acid-based compound and a derivative thereof and reacting these compounds. The compounds to be used in the reaction are not particularly limited, and examples of the 2-bromoisobutyric acid-based compound include 2-bromoisobutyric acid, 2-bromoisobutyric bromide, and 2-bromoisobutyric anhydride. By reacting any of these compounds and an organic compound having a reactive group, such as a hydroxy group, an amino group, an epoxy group, a carbodiimide group, an oxazoline group, an isocyanate group, or an ethyleneimine group, that can react and is to be a pair with a carboxyl group-based compound, the "group of formula 2" can be introduced in the organic compound with an ester bond or an amide bond.

The organic compound of (2) that characterizes the present invention is an organic compound having at least one "group of formula 1" described above or "group of formula 2", which is more preferably used among the "groups of formula 1" described above (these are sometimes written together as "group of formula 1 or 2"), introduced in the molecule thereof, the "group of formula 1" or the "group of formula 2" functioning as a polymerization initiation group for the previously described monomer of (1). As described previously, as the organic compound to be used, any form may be used, and a conventionally known organic compound can be used. A great number of conventionally known organic compounds exist and cannot be exemplified. Hereinafter, how the monomer of (1) can be polymerized and how the polymers having various structures can be formed without using any of an azo-based radical polymerization initiator, a peroxide-based radical polymerization initiator, and a photo radical polymerization initiator used in conventional radical polymerization by using the organic compound of (2) that characterizes the present invention will be described.

When the monomer of (1) is mixed and warmed in a state where the organic compound of (2) having constitution in which one "group of formula 1 or 2" specified in the present invention is introduced in the molecule thereof and the Cl/Br ion-containing compound of (3), which will be described later, are used together, polymerization of the monomer of (1) is initiated from the "group of formula 1 or 2" in the organic compound of (2) as a polymerization initiation group and progresses, so that a straight-chain polymer formed from the monomer of (1) as a constituent can be obtained. In addition, when the same operation as described above is conducted using the organic compound of (2) having constitution in which two "groups of the formula 1 or 2" are introduced in the molecule thereof, a resultant polymer has a structure obtained in such a way that the polymerization has been initiated so that two chains extend from the organic compound of (2). Therefore, in the case where the organic compound of (2) to be used takes a form of a polymer component, when both ends of the polymer have the "group of formula of 1 or 2"; the polymer is assumed to be B; and a polymerized product from the monomer of (1) is assumed to be A, an A-B-A block copolymer can be made. In addition, in this case, when the polymer as the organic compound of (2) to be used takes a form in which two "groups of formula 1 or 2" hang down in the molecule thereof, a resultant polymer can be made into a polymer having a comb-shaped structure with two combs.

As the polymer as the organic compound of (2), a conventionally known polymer can be used, and the polymer is not particularly limited. Examples of the conventionally known polymer include polymers such as polyethers, polyesters, polyamides, polyurethanes, polyolefins, polyimides, polyacrylics, polymethacrylics, polystyrenes, polycarbonates, polysilicones, polyhalogenated olefins, and polyvinyl alcohols. These may be a polymer having any one of the structures of a homopolymerized product, a copolymerized product, a graft copolymer, and a block copolymer.

Further, in the production method according to the present invention, when an organic compound having three or more plural "groups of formula 1 or 2" introduced therein is used as the organic compound of (2), a branched structure type polymer, a star polymer, or a graft polymer can be obtained. Among others, a polymerized product (polymer) of a vinyl monomer having three or more "groups of formula 1 or 2" introduced therein is preferably used as the organic compound of (2). That is, when a vinyl polymer having a plurality of the "groups of formula 1 or 2" introduced therein is used as the organic compound of (2), a polymer obtained by polymerizing the monomer of (1) is made into a polymer having a structure in which the vinyl polymer being the organic compound of (2) is grafted or a bottlebrush polymer having a bottle-shaped structure. By constituting the production method according to the present invention as described above, a useful polymer having a unique characteristic can be obtained industrially, simply, and inexpensively.

The vinyl polymer having the "group of formula 1 or 2" introduced therein may be obtained by polymerizing a monomer having the "group of formula 1 or 2" introduced therein, or the "group of formula 1 or 2" may be introduced after a monomer having a hydroxy group or the like is polymerized in advance. In addition, the vinyl polymer may be a copolymer produced by copolymerizing the monomer having the "group of formula 1 or 2" introduced therein and another monomer, described previously. In this case, the amount of the monomer having the "group of formula 1 or 2" introduced therein to be blended is arbitrary and is not particularly limited.

In addition, the above-described polymer having the "group of formula 1 or 2" introduced therein, which is used as the organic compound of (2), is more preferably a polymer obtained by living radical polymerization because the molecular weight distribution is made narrow. In that case, among the living radical polymerization methods, the Nitroxide-Mediated Polymerization method (NMP method) using a nitroxide radical, Reversible Addition-Fragmentation Chain Transfer (RAFT method) using a dithioester compound or the like, Reversible chain Transfer Catalyzed Polymerization (RTCP method) using an iodine compound and an organic catalyst, and the like are used using the monomer having the "group of formula 1 or 2" introduced therein, but the living radical polymerization method is not particularly limited. However, atom transfer radical polymerization utilizing oxidation-reduction is not preferable because there is a possibility that gelation occurs due to polymerization of a monomer and polymerization initiation from a bromo group.

Further, when the monomer having the "group of formula 1 or 2" introduced therein as the organic compound of (2) and a reactive monomer in particular as another monomer component are used; these are copolymerized; a surface of an article is treated using this copolymer having a reactive group; and thereafter the monomer of (1) is polymerized using, as a polymerization initiation group, the "group of formula 1 or 2" that constitutes the copolymer, a polymer can thereby be introduced on the surface of the article in a graft-like manner. That is, the surface of the article can be modified by the polymer introduced in a graft-like manner.

In the above-described case, when the polymerization method using the monomer having the "group of formula 1 or 2" introduced therein and a vinyl monomer having an alkoxysilyl group is living radical polymerization, a concentrated polymer brush structure in which polymers each have an extended chain, and the molecular weight is uniform can be introduced because the speed of introducing the monomer to the copolymer is constant, and the termination reaction does not occur, which are peculiar to living radical polymerization. Specifically, in this case, for example, the organic compound of (2) is made into a polymer component as described below and is used. Firstly, the monomer having the "group of formula 1 or 2" introduced therein and the vinyl monomer having an alkoxysilyl group is copolymerized into a polymer component having the "group of formula 1 or 2" introduced therein and having an alkoxysilyl group, this polymer is applied on a surface of a base material, such as glass, a metal, or plastic, to surface-modify the base material, the radically polymerizable monomer of (1) is polymerized making the "group of formula 1 or 2" that characterizes the present invention function as a polymerization initiation group, and thereby a grafted structure (concentrated polymer brush structure) of the polymer can easily be introduced to an article.

In the present invention, the organic compound having at least one "group of formula 1 or 2" introduced therein is used as the organic compound of (2), but the constitution such that the organic body having two or more "groups of formula 1 or 2" is used as the organic compound of (2) as described above is more preferably taken. Specific examples of the organic body include a polymer having two "groups of formula 1 or 2" introduced in the molecule thereof, or a compound having three or more "groups of formula 1 or 2" introduced in the molecule thereof, or a vinyl polymer having three or more "groups of formula 1 or 2" introduced in the molecule thereof, or a copolymer of a monomer having at least one "group of formula 1 or 2" introduced in the molecule thereof and a monomer having a reactive group capable of being bonded to a surface of a base material. By taking such constitution, a polymer having a useful structure which has never been able to be obtained easily by conventional techniques can simply be obtained. When the organic compound of (2) having one "group of formula 1 or 2" is used, the polymer obtained by the novel polymerization method specified in the present invention is a straight-chain polymer, as described previously. A straight-chain polymer can also be obtained by usual radical polymerization or living radical polymerization, and therefore the merit of using the organic compound of (2) having one "group of formula 1 or 2" is not so significant as compared to the production method according to the present invention using the organic compound having two or more "groups of formula 1 or 2" introduced therein.

In addition, by adjusting the amount of the "group of formula 1 or 2" to be introduced in the organic compound of (2), the molecular weight of a resultant polymer can be controlled in some cases. This is also a characteristic of the production method according to the present invention. In the production method according to the present invention, polymerization is initiated from the "group of formula 1 or 2" introduced in the organic compound of (2), and therefore by adjusting the amount of the monomer of (1) to 1 mol of the compound containing the "group of formula 1 or 2", the molecular weight of a polymer to be produced can be adjusted. However, in the novel polymerization method specified in the present invention, a termination reaction, such as that in radical polymerization, accompanies the polymerization, so that a high-molecular-weight product may be produced due to coupling, and in that case, the molecular weight cannot be adjusted by the amount of the initiation group. In that case, the coupling can be avoided by addition of a "catalyst", which will be described later.

According to studies conducted by the present inventors, the organic compound of (2) (radical polymerization initiation group-containing compound according to the present invention) is preferably a polymer containing as a constituent at least 2-(2-bromoisobutyryloxy)ethyl methacrylate being the organic body having the "group of formula 2". That is, 2-(2-bromoisobutyryloxy)ethyl methacrylate can be utilized as a monomer, is commercially available, can also be obtained by reacting 2-hydroxyethyl methacrylate, which is a general-purpose monomer, and bromoisobutyric acid or the like, and therefore is useful as an industrial material.

[(3) Chloride Ion-Containing and/or Bromide Ion-Containing Compound Selected from Particular Compounds]

In the method for producing a polymer according to the present invention, at least one chloride ion-containing and/or bromide ion-containing compound of (3) (Cl/Br ion-containing compound of (3)) selected from the group consisting of a metal chloride, a metal bromide, a quaternary ammonium chloride, a quaternary ammonium bromide, a quaternary phosphonium chloride, and a quaternary phosphonium bromide is used together with the organic compound of (2). Hereinafter, the Cl/Br ion-containing compound of (3) will be described. The details on the action of these compounds has not been made clear. According to studies conducted by the present inventors, it can be considered that by using these compounds together, bromine in the structure of the "group of formula 1 or 2" introduced in the organic compound of (2) undergoes bromine-bromine exchange or bromine-chlorine exchange with the Cl/Br ion-containing compound to produce radicals at the time of the exchange, and the monomer of (1) is inserted there, so that polymerization is initiated from there. In addition, there is a possibility that the Cl/Br ion-containing compound of (3) acts as a catalyst for oxidation-reduction to allow the polymerization of the monomer of (1) to progress. Hereinafter, the Cl/Br ion-containing compound of (3) is sometimes written as the "halogenating agent of (3)".

The Cl/Br ion-containing compound of (3) is a compound selected from the group consisting of a metal chloride, a metal bromide, a quaternary ammonium chloride, a quaternary ammonium bromide, a quaternary phosphonium chloride, and a quaternary phosphonium bromide, and any of these compounds which are conventionally known and have a chlorine ion or a bromine ion can be used and is not particularly limited. Specific examples of the Cl/Br ion-containing compound of (3) include those described below. Examples of the metal chloride include lithium chloride, sodium chloride, potassium chloride, calcium chloride, and magnesium chloride. Examples of the metal bromide include lithium bromide, sodium bromide, potassium bromide, and magnesium bromide. Examples of the quaternary ammonium chloride include tetramethylammonium chloride, tetraethylammonium chloride, and tetrabutylammonium chloride. Examples of the quaternary ammonium bromide include tetramethylammonium bromide, tetraethylammonium bromide, and tetrabutylammonium bromide. Examples of the quaternary phosphonium chloride include tetrabutylphosphonium chloride, tributylmethylphosphonium chloride, and triphenylmethylphosphonium chloride. Examples of the quaternary phosphonium bromide include tetrabutylphosphonium bromide, tributylmethylphosphonium bromide, and triphenylmethylphosphonium bromide.

In addition, the amount of use of these halogenating agents of (3) is preferably about equimolar to the moles of the "group of formula 1 or 2" that constitutes the organic compound of (2) to be used together, but the amount of use may be determined according to the polymer intended to be produced and is not particularly limited. For example, adding the halogenating agent of (3) in an amount by which a part of the number of moles of the "group of formula 1 or 2" is replaced with chlorine ions or bromine ions in the halogenating agent of (3) without setting the amount of use of the halogenating agent of (3) to be equimolar to the number of moles of the "group of formula 1 or 2" is also a preferred embodiment. By constituting the amount of use in this way, part of the "groups of formula 1 or 2" in the organic compound of (2) is halogenated, and polymerization of the monomer of (1) is initiated from the part, so that the polymer can be obtained. When the halogenating agent of (3) is further added to the obtained polymer after that, and a resultant mixture is mixed and warmed, residual bromine in the "groups of formula 1 or 2" that has been introduced in the organic compound of (2) is replaced with chlorine ions or bromine ions in the halogenating agent of (3), and polymerization of another type of the monomer of (1) can thereby be initiated from the part, so that a polymer in which a plurality of types of polymer chains are grafted can be obtained.

[(4) Compound Having any One of Groups Selected from Group Consisting of Imide Group, N-Bromoimide Group, N-Iodoimide Group, and Organic Base]

In the method for producing a polymer according to the present invention, radical polymerization of the monomer of (1) is initiated from the "group of formula 1 or 2" and progresses in the polymerization step in which the materials of (1) to (3) described above are used, and mixed and warmed (heated), so that the polymer can be obtained. According to studies conducted by the present inventors, the polymerization step is preferably performed further adding, as necessary, any one of the compounds of (4) having a group selected from the group consisting of an imide group, an N-bromoimide group, an N-iodoimide group, and an organic base, in addition to the materials of (1) to (3). According to studies conducted by the present inventors, by further adding these materials, the previously described termination reaction, which occurs in the polymerization step according to the present invention, of radical polymerization can be prevented, so that molecular weight increase and gelation can be prevented. The action is not made clear, but the present inventors consider that by further using the compound of (4) together, bromine or the amino group for example is converted into a radical, thereby contributing to the prevention of coupling of propagating radicals. Hereinafter, the component of (4) is sometimes simply referred to as the "catalyst" or the "catalyst of (4)".

The catalyst of (4) may be a compound having any one of groups selected from the group consisting of an imide group, an N-bromoimide group, an N-iodoimide group, and an organic base, and conventionally known compounds are used and they are not particularly limited. Specifically, examples of the compound having an imide group include cyclic imide compounds such as succinimide, maleimide, and phthalimide, examples of the compound having an N-bromoimide group include N-bromosuccinimide, N-bromophthalimide, and N-bromocyclohexanylimide, and examples of the compound having an N-iodoimide group include N-iodosuccinimide, N-iodophthalimide, and N-iodocyclohexanylimide. In addition, as the organic base, conventionally known organic bases, such as triethylamine, tributylamine, pyridine, morpholine, diazabicycloundecene (DBU), diazabicyclooctane (DABCO), and a phosphazene base, can be used.

The amount of these catalysts of (4) is arbitrary and is not particularly limited. These catalysts of (4) are preferably used in a range of 0.001 mol times to 0.1 mol times the moles of the "group of formula 1 or 2" in (2), which is used together and which functions as a polymerization initiation group. Too much amount of use is not preferable because there is a possibility that the action as a catalyst is not exhibited sufficiently and a side reaction or the like occurs.

[Organic Solvent]

Hereinafter, the other materials that can be used in the method for producing a polymer according to the present invention will be described. Solution polymerization in which polymerization is performed using an organic solvent is preferable in the polymerization step of the method for producing a polymer according to the present invention. According to studies conducted by the present inventors, the halogenating agent of (3) can exhibit its effect even if it is not dissolved in the reaction system. Preferably, the halogenating agent of (3) is dissolved in the reaction system and is made uniform. On the other hand, there are some cases where an ionic material such as the halogenating agent of (3), which is the Cl/Br ion-containing compound, cannot be dissolved in the monomer of (1), and in addition, the exchange between bromine in the structure of the "group of formula 1 or 2" introduced in the organic compound of (2) and the halogen ion in the halogenating agent of (3) needs to be performed dissolving the halogenating agent as described previously, and to do that, a highly polar organic solvent, as described below, is preferably used in part or the whole part of the solvent.

Specifically, an organic solvent which is an alcohol-based solvent, a glycol-based solvent, an amide-based solvent, a sulfoxide-based solvent, or an ionic liquid is preferably used. However, these organic solvents are not necessarily needed, and for example, when a monomer that dissolves the halogenating agent is used, polymerization can be performed without using an organic solvent in particular. As a generally used organic solvent, a conventionally known, nonpolar solvent, such as a hydrocarbon-based solvent, a halogen-based solvent, a ketone-based solvent, an ester-based solvent, or a glycol-based solvent, exists, and a highly polar solvent as described above may be used together with any of these solvents. In that case, the ratio of the highly polar solvent is arbitrary, and solvents are selected so that the polymer according to the present invention obtained by polymerizing the monomer of (1) can be dissolved.

As described above, a conventionally known organic solvent can be used as the organic solvent, and as a preferred solvent, an alcohol-based solvent, a glycol-based solvent, an amide-based solvent, a urea-based solvent, a sulfoxide-based solvent, and an ionic liquid, such as those described below, can be used. Specific examples thereof include: alcohol-based solvents such as methanol, ethanol, and iso-propanol; glycol-based solvents such as ethylene glycol, propylene glycol, glycerin, diethylene glycol, and propylene glycol monomethyl ether; amide-based solvents such as dimethylformamide, dimethylacetamide, N-methylpyrrolidone, 3-methoxy-N,N-dimethylpropanamide, and 3-butoxy-N, N-dimethylpropanamide; urea-based solvents such as tetramethylurea and dimethyl imidazolidinone; sulfoxide-based solvents such as dimethyl sulfoxide; and ionic liquids such as imidazolium salts and quaternary ammonium salts. These can be used singly or in combinations of two or more thereof.

The amount of use of these organic solvents at the time of polymerization is not particularly limited as long as the halogenating agent of (3) is dissolved. The amount of use of these organic solvents is preferably 30% to 80% on a mass basis. If the amount of use thereof is less than 30%, the solid content is too high, so that viscosity may be high, and if the amount of use thereof is larger than 80%, the monomer concentration is too low, so that the rate of polymerization may not be raised. The amount of use thereof is preferably 40% to 70%.

The method for producing a polymer according to the present invention has a major characteristic in that basically, it can be carried out without using a radical polymerization initiator from which radicals are produced. Conventionally, when a monomer having an unsaturated bond is polymerized, polymerization has been performed using a compound that produces radicals, such as an azo-based compound, a peroxide-based compound, or a thiol. However, in the production method according to the present invention, polymerization progresses easily by mixing the above-described materials of (1) to (3) and applying heat without using such a radical polymerization initiator. It is expected that the polymer is obtained by the polymerization method according to the present invention even when a radical polymerization initiator is used together depending on the circumstances. However, in that case, polymerization may also be initiated from the radical polymerization initiator, and therefore the use of the radical polymerization initiator is not preferable in view of the object of obtaining a desired polymer having a complicated structure. In the production method according to the present invention, polymerization is preferably performed without using a radical polymerization initiator. That is, radical polymerization is initiated from the structure of the "group of formula 1 or 2" introduced in the organic compound of (2), and therefore, as described previously, the molecular weight can be controlled by the amount of the organic compound having the "group of formula 1 or 2" introduced therein and the amount of the halogenating agent of (3) for converting the "group of formula 1 or 2" so that the "group of formula 1 or 2" can function as a polymerization initiator, and a polymer derived from a radical initiator cannot be produced, so that usual radical polymerization is controlled and only a polymer produced using the "group of formula 1 or 2" as a polymerization initiation group can be obtained.

[Polymerization Step]

Described above are the materials necessary for the method of producing a polymer according to the present invention, and in the present invention, when these materials are mixed and warmed (heated), radical polymerization of the monomer is thereby initiated from the "group of formula 1 or 2" and progresses, so that the polymer can be obtained. The polymerization conditions are not particularly limited, and a conventionally known method is adopted. More preferred conditions are as follows, polymerization progresses better in a nitrogen or argon atmosphere or with nitrogen or argon bubbling because an influence of oxygen does not exist. In addition, the temperature may be room temperature or 40° C. or higher, but when the temperature is around room temperature, polymerization takes much time, and therefore it is suitable to perform polymerization at preferably 60° C. or higher, or 70° C. or higher in that preferred production time in practical production can be realized. In addition, the stirring speed does not have an influence on polymerization in particular, and light shielding is not necessarily needed. The rate of polymerization is arbitrary and the monomer does not have to be consumed completely.

[Polymer]

In the method for producing a polymer according to the present invention, the materials described previously are prepared, mixed, and warmed under the conditions described above, and thereby the polymer can simply be prepared. Further, by appropriately designing the form of the organic compound of (2) (radical polymerization initiation group-containing compound according to the present invention) that characterizes the present invention, and further, by using the catalyst of (4) as necessary, a desired polymer having a unique (complicated) structure can be obtained industrially and more easily. That is, by utilizing the polymerization method according to the present invention, desired polymers controlled into various forms as described below can easily be provided. The polymers to be provided by the present invention include a straight-chain polymer, an AB block copolymer, an ABA block copolymer, a branched type polymer, a graft polymer, a star polymer (star-shaped polymer), a concentrated polymer brush, a bottlebrush polymer, and the like.

According to the polymerization method for a polymer using the organic compound of (2) that characterizes the present invention, the polymers in various forms as described above can be synthesized in a simple manner that has never been existed so far. As a specific example, a bottlebrush polymer, which is a type of graft polymers, can be synthesized using conventionally known, commercially available, general-purpose materials without the need for purification, and, depending on the circumstances, in one pot. More specifically, an amide-based solvent is used, and 2-(2-bromoisobutyryloxy)ethyl methacrylate, which is a monomer containing the previously described "group of formula 2", is subjected to radical polymerization or living radical polymerization singly or using another monomer therewith to thereby obtain a polymer having a plurality of the "groups of formula 2" introduced therein. Subsequently, by carrying out the polymerization step specified in the present invention, in which tetrabutylammonium chloride as the halogenating agent of (3) and the monomer of (1) intended to be grafted onto the obtained polymer are added, and the previously described catalyst of (4) is added as necessary to thereafter mix and warm a resultant mixture, a graft type copolymer in which polymer chains are produced by polymerization being initiated from the "groups of formula 2" can be obtained in one pot.

The polymer according to the present invention obtained in the manner as described above may be used as it is, or a polymer component obtained by adding the obtained polymer into a poor solvent to be precipitated and purified may be used.

The polymer obtained by the present invention can be used for conventionally known applications, and the conventionally known applications are not particularly limited. For example, the polymer can be applied to various fields, such as inks, paints, coating, plastics, inkjet inks, color filter materials, energy-related materials, mechanical component-related materials, medical devices, medical materials, or chemicals-related fields.

EXAMPLES

Hereinafter, the present invention will be described in more detail giving Examples and Comparative Examples, but the present invention is not limited to these Examples. Hereinafter, "part (s)" and "%" in the description below are each on a mass basis unless otherwise noted.

Example 1: Preparation of Graft Copolymer Using Polymer Having Plurality of Polymerization Initiation Groups (a) Preparation of Polymerization Initiation Group-Containing Polymer In a reaction apparatus equipped with a stirrer, a reflux condenser, a thermometer, and a nitrogen-introducing tube, 561.0 parts of 3-methoxy-N,N-dimethylpropanamide (hereinafter, abbreviated as MDPA) as a solvent, 1.0 part of iodine, 3.7 parts of 2,2'-azobis (4-methoxy-2,4-dimethyl-valeronitrile) [trade name: V-70, manufactured by FUJIFILM Wako Pure Chemical Corporation] being a radical polymerization initiator, 208.0 parts of 2-hydroxyethyl methacrylate, and 0.113 parts of N-iodosuccinimide (hereinafter, abbreviated as NIS) were added, and a resultant mixture was subjected to polymerization at 65° C. for 7 hours under nitrogen bubbling. The rate of polymerization was almost 100%. In addition, the molecular weight was measured by gel permeation chromatography (hereinafter, abbreviated as GPC) using an N,N-dimethylformamide solvent to find that the number average molecular weight (hereinafter, abbreviated as Mn) was 18500, and the molecular weight distribution (weight average molecular weight/ number average molecular weight, hereinafter, abbreviated as PDI) was 1.35.

Subsequently, 189.5 parts of pyridine was added, and a resultant mixture was cooled to 5° C. in an ice bath. In a dropping funnel, 459.8 parts of 2-bromoisobutyric bromide was loaded, the dropping funnel was then attached to the apparatus, dropping was performed in 3 hours so that the temperature would not exceed 10° C., and a resultant mixture was left to stand at the temperature for 2 hours. Thereafter, the mixture was warmed to 45° C. to be thereby reacted for 1 hour. After the reaction mixture was cooled to room temperature, 561 parts of methanol was added thereto, and a resultant solution was stirred. Subsequently, 5000 g of methanol was prepared in another container, and the solution was gradually added to the methanol under stirring with a disper. A polymer was precipitated to obtain a soft polymer. The polymer was isolated and added into a large amount of water under stirring with a disper to be washed, and subjected to filtration, and the residue was washed with water and dried with a fan drying machine of 50° C. until a volatile component disappeared, and thus the polymer was purified. As a result, a white, powdery solid was obtained.

The white, powdery solid obtained above is a polymer in which a plurality of the "groups of formula 2" specified in the present invention are bonded to the side chain, as shown in the following scheme I. That the powdery solid is the polymer having a plurality of the "groups of formula 2" introduced in the side chain thereof was ascertained by identification with an infrared spectrophotometer (IR) and a nuclear magnetic resonance apparatus (NMR). This polymer is referred to as KP-1. In addition, the molecular weight of KP-1 was measured by GPC with a tetrahydrofuran (abbreviated as THF) solvent to find that the Mn was 26000, and the PDI was 1.41.

Scheme I

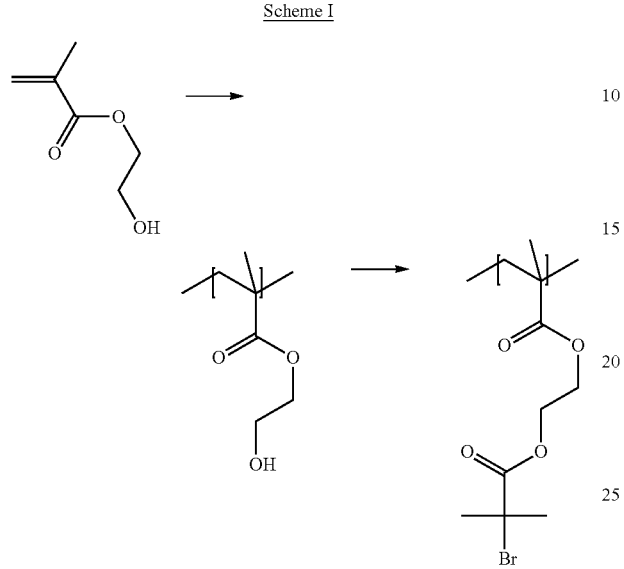

(b) Preparation of Graft Copolymer

Synthesis Example 1

The same reaction apparatus as the one used in preparing the previously described polymerization initiation group-containing polymer was used, 131.1 parts of MDPA, 50 parts of methyl methacrylate (hereinafter, abbreviated as MMA) as the monomer of (1), 2.7 parts of KP-1, as the organic compound of (2), previously prepared in (a) and being a polymer having the "groups of formula 2", and 3.5 parts of tetrabutylammonium bromide (hereinafter, abbreviated as TBAB) as the bromide ion-containing compound of (3) were added, and a resultant mixture was subjected to polymerization at 80° C. for 8 hours. Polymerization progressed, the mixture was changed into a highly viscous liquid and was therefore sampled, and the rate of polymerization was measured and found to be 85%. In addition, the molecular weight was measured by GPC with a THF solvent to find that the Mn was 340500, and the PDI was 2.43. From the fact that the Mn of KP-1 used in the polymerization was 26000, it was ascertained that polymerization of MMA is initiated from "the groups of formula 2" in the structure of KP-1 without using an azo-based or peroxide-based radical polymerization initiator, so that a graft copolymer can be obtained.

Synthesis Examples 2 to 10

Graft copolymers were prepared using the same reaction apparatus as the one in Synthesis Example 1 and using materials shown in Table 1 by the same operation as in Synthesis Example 1. In Table 1, (1) shows radically polymerizable monomers used in Synthesis Examples, KP-1 in (2) shows the polymerization initiation group-containing polymer which was prepared in (a) and corresponds to the organic compound having at least one polymerization initiation group introduced in the molecule thereof, (3) shows chloride ion-containing or bromide ion-containing compounds, and (4) shows compounds having an imide group or an organic base, the compounds exhibiting a catalytic function by which a termination reaction of radical polymerization can be prevented.

TABLE 1

Materials for preparing graft copolymers of Example 1 (Unit: Parts)

| | | Synthesis Examples | | | | | | | | | |
|---|---|---|---|---|---|---|---|---|---|---|---|
| | | 1 | 2 | 3 | 4 | 5 | 6 | 7 | 8 | 9 | 10 |
| | MDPA (solvent) | 131.1 | 131.6 | 128.8 | 124.1 | 126.5 | 132.5 | 132.8 | 124.2 | 125.8 | 129.0 |
| (2) | KP-1 | 2.7 | 2.7 | 2.7 | 2.7 | 2.7 | 2.7 | 2.7 | 2.7 | 2.7 | 2.7 |
| (3) | TBAB*[1] | 3.5 | | | | | | | | | |
| | TBPB*[2] | | 3.7 | | | | 3.7 | 3.7 | | | |
| | BzTAC*[3] | | | 2.5 | | | | | | | 2.5 |
| | LiCl | | | | 0.5 | | | | 0.5 | | |
| | LiBr | | | | | 1.0 | | | | 1.0 | |
| (1) | MMA | 50 | | | | | 30 | 30 | | | |
| | BzMA*[4] | | 30 | | 40 | | 10 | 10 | 50 | 50 | |
| | BMA*[5] | | | 45 | | | 10 | 10 | | | |
| | 2EHMA*[6] | | 20 | | | 50 | | | | | 40 |
| | MAA*[7] | | | 5 | | | | | | | 10 |
| | PAMA*[8] | | | | 10 | | | | | | |
| (4) | TEA*[9] | | | | | 0.5 | | | | | |
| | Py*[10] | | | | | | 0.4 | | | | |
| | NMM*[11] | | | | | | | 0.5 | | | |
| | NIS*[12] | | | | | | | | | | 0.03 |

TABLE 1-continued

Materials for preparing graft copolymers of Example 1 (Unit: Parts)

| | Synthesis Examples | | | | | | | | | |
|---|---|---|---|---|---|---|---|---|---|---|
| | 1 | 2 | 3 | 4 | 5 | 6 | 7 | 8 | 9 | 10 |
| NBS*[13] | | | | | | | | | 0.2 | |
| SI*[14] | | | | | | | | | | 0.1 |
| Solid content | 30% | 30% | 30% | 30% | 30% | 30% | 30% | 30% | 30% | 30% |

*[1]Tetrabutylammonium bromide
*[2]Tetrabutylphosphonium bromide
*[3]Benzyl triethylammonium chloride
*[4]Benzyl methacrylate
*[5]Butyl methacrylate
*[6]2-Ethylhexyl methacrylate
*[7]Methacrylic acid
*[8]2-Methacryloyloxyethyl phthalate
*[9]Triethylamme
*[10]Pyridine
*[11]N-Methylmorpholine
*[12]N-Iodosuccinimide
*[13]N-Bromosuccinimide
*[14]Succinimide Table 2 shows the values of the physical properties of the graft copolymers obtained in Synthesis Examples 1 to 10.

TABLE 2

Physical properties of graft copolymers of Example 1

| | Monomer composition and composition ratio of graft chain | Molecular weight | | Measured acid value* |
|---|---|---|---|---|
| | | Mn | PDI | mgKOH/g |
| Synthesis Example 1 | MMA = 100 | 340500 | 2.43 | — |
| Synthesis Example 2 | BzMA/2EHMA = 60/40 | 452200 | 2.86 | — |
| Synthesis Example 3 | BMA/MAA = 90/10 | 355400 | 3.56 | 64.3 |
| Synthesis Example 4 | BzMA/PAMA = 80/20 | 478500 | 3.85 | 39.1 |
| Synthesis Example 5 | 2EHMA = 100 | 526100 | 2.79 | — |
| Synthesis Example 6 | MMA/BzMA/BMA = 60/20/20 | 368700 | 3.05 | — |
| Synthesis Example 7 | MMA/BzMA/BMA = 60/20/20 | 349900 | 3.10 | — |
| Synthesis Example 8 | BzMA = 100 | 480600 | 2.59 | — |
| Synthesis Example 9 | BzMA = 100 | 471000 | 2.70 | — |
| Synthesis Example 10 | 2EHMA/MAA = 80/20 | 510500 | 3.54 | 126.4 |

*calculated from titer obtained by neutralization titration with 0.1N ethanolic potassium hydroxide solution using phenolphthalein solution as indicator Example 2: Synthesis of Multi-Branched Polymer The same reaction apparatus as the one used in Synthesis Example 1 was used, and 100 parts of MDPA, 1.83 parts of pentaerythritol tetrakis(2-bromoisobutyrate) corresponding to the organic compound of (2) and having 4 "groups of formula 2", 100.0 parts of MMA as the monomer of (1), and 3.8 parts of TBAB as the bromide ion-containing compound of (3) were loaded, and a resultant mixture was warmed to 75° C. under nitrogen bubbling. Subsequently, 0.74 parts of triethylamine (hereinafter, written as TEA) being the organic base was added as the catalyst of (4), and a resultant mixture was subjected to polymerization for 7 hours. The rate of polymerization was 94.7%, the Mn was 25600, and the PDI was 1.48 for the obtained polymer. From these facts, it was ascertained that a multi-branched polymer having four chains is obtained.

Example 3: Synthesis of Star-Shaped Polymer

The following materials were loaded in the same reaction apparatus as the one used in Synthesis Example 1, and a polymer to be a core was synthesized in the manner as described below. Loaded and stirred were 400 parts of MDPA, 40 parts of 2-(2-bromoisobutyryloxy)ethyl methacrylate (manufactured by GODO SHIGEN Co., Ltd., hereinafter, abbreviated as BEMA) corresponding to the organic compound of (2) and being the radically polymerizable monomer having the "group of formula 2", 160 parts of MMA as the monomer of (1), and 41.6 parts of lauryltrimethylammonium chloride (hereinafter, abbreviated as LTMAC) as the chloride ion-containing compound of (3), and a resultant mixture was warmed to 75° C. After LTMAC dissolved and the whole solution became uniform, 2.8 parts of TEA being the organic base was added as the catalyst of (4), and a resultant mixture was subjected to polymerization for 7 hours keeping the above-described temperature. The reaction mixture was sampled, the solid content was measured and found to be 38.8%, and the rate of polymerization calculated based on this solid content was almost 100%. The molecular weight was measured by GPC to find that the Mn was 7600, and the PDI was 1.53. A core polymer solution was obtained in the manner as described above.

In a 10-L beaker, 5000 parts of methanol was loaded and stirred at 1500 rpm with a disper. Subsequently, the core polymer solution obtained above was added in the methanol to precipitate the core polymer. After the obtained polymer slurry was subjected to filtration, the residue was washed with methanol, subsequently washed with water, and dried with a drying machine of 70° C. for 24 hours to purify the polymer. The obtained polymer in a dried state is a polymer to be a core, the polymer having a plurality of the "groups of formula 3" inside thereof, and this polymer is referred to as CP-1.

In the same reaction apparatus as the one described above, 600 parts of MDPA, and 40 parts of CP-1 corresponding to the organic compound of (2) were loaded, and a resultant mixture was warmed to 80° C. to dissolve CP-1 completely. Subsequently, after 10.4 parts of LTMAC was added as the chloride ion-containing compound of (3) and dissolved, 360 parts of MMA as the monomer of (1), and subsequently, as the catalyst of (4), 5.6 parts of TEA being the organic base were added, and a resultant mixture was subjected to polymerization for 6 hours keeping the above-described temperature. The solid content was 39.7%, and the rate of polymerization calculated based on this solid content was almost 100%. In addition, the molecular weight was measured by GPC to find that the Mn was 15100, and the PDI was 1.58. From the facts that the molecular weight was larger as compared to the core polymer CP-1, and the peak of the core polymer disappeared, it was ascertained that polymers extend from the ends of the core polymer and it was found that a star-shaped polymer is obtained.

Example 4: Preparation of Cross-Linked Acrylic Fine Particle Using Polymer Fine Particle Having Polymerization Initiation Group In a 2-L three-neck round flask reaction apparatus with a thermometer attached thereto, 670 g of ethyl acetate as a solvent, 65 parts of diethylene glycol dimethacrylate (hereinafter, abbreviated as DEGDMA) as the monomer of (1), and 5.7 parts of BEMA corresponding to the organic compound of (2) and being the radically polymerizable monomer having the "group of formula 2" were added, and the flask was stopped up with a stopper loosely and immersed in a hot water bath of 70° C. In another container, 20 parts of ethyl acetate and 2.2 parts of 2,2'-azobisisobutyronitrile being a radical polymerization initiator were dissolved to prepare an initiator solution for preparing a polymer fine particle being the organic compound corresponding to (2). Subsequently, when the temperature of the whole system of the glass bottle (round flask) reached 65° C., the initiator solution was added from another container, and a resultant mixture was reacted for 10 hours at the temperature. As a result, the system became clouded, and particles aggregated to be precipitated. The reaction mixture was cooled after the polymerization reaction was completed. The solution was subjected to filtration, and the residue was washed well with ethyl acetate and dried with a fan drying machine of 70° C. to obtain 69.7 parts of a white, powdery, fine particle (beads). It can be considered from the yield that almost all the monomers were reacted. That is, the constitution is such that in the mass of the beads (fine particle), the content of BEMA corresponding to the organic compound of (2) is 8.1%, and the content of DEGDMA is 91.9%.

The obtained fine particle was measured with a Coulter counter (manufactured by Beckman Coulter, Inc.) to find that the weight average particle diameter was 1.84 µm. Hereinafter, the weight average particle diameter was measured by this method unless otherwise noted. The obtained white powder was pulverized with a pulverizer and passed through a 100-mesh. This fine particle is referred to as a fine particle B-1.

In a 500-ml separable flask with a nitrogen-introducing apparatus and a cooling tube installed thereto, 200 parts of N-methyl-2-pyrrolidone (hereinafter, abbreviated as NMP), 20 parts of the above-obtained fine particle B-1 corresponding to the organic compound of (2), and subsequently 2.17 parts of TBAB as the bromide ion-containing compound of (3) were added, and a resultant mixture was warmed to 75° C. in 30 minutes. Subsequently, when the temperature reached 75° C., 40 parts of MMA as the monomer of (1), and, as the catalyst of (4), 0.1 parts of TEA being the organic base were added, and a resultant mixture was subjected to polymerization at 75° C. for 8 hours to obtain a polymerization solution after cooling.

The polymerization solution obtained above was diluted with methyl ethyl ketone (hereinafter, abbreviated as MEK) and subjected to filtration with a pressure filter of 10 µm to take out a solid product. In addition, in a 3000-ml flask, 1500 g of methanol was loaded, and the flask was attached to a stirring apparatus to stir the methanol. The residue was added to this methanol and stirred, a resultant mixture was subjected to filtration, and the residue was washed well with methanol and dried at 25° C. (room temperature) for 12 hours and then at 80° C. for 24 hours to obtain a white, lump material (fine particle). The weight average particle diameter of the obtained fine particle was 2.65 µm. This fine particle is referred to as a fine particle A-1. From the fact that the particle diameter of the fine particle A-1 is larger than the fine particle B-1 before polymerizing MMA, it was found that polymers further extend from the "groups of formula 2" existing on the surface of the fine particle B-1. From those described above, it can be considered that a crosslinked acrylic fine particle was obtained.

Example 5: Preparation of Plurality of Polymers

The same apparatus as the one in Synthesis Example 1 was used, 200 parts of MDPA, 30 parts of MMA as the monomer of (1), 5.5 parts of the previously prepared KP-1 as the polymer corresponding to the organic compound of (2) and having the "group of formula 2", 0.38 parts of lithium chloride (LiCl) as the chloride ion-containing compound of (3), and, as the catalyst of (4), 0.1 parts of succinimide being the compound having an imide group were added, and a resultant mixture was subjected to polymerization at 75° C. for 8 hours. Polymerization progressed, the mixture was changed into a highly viscous liquid and was therefore sampled, and the rate of polymerization was measured and found to be 81%. In addition, the Mn was 261000, and the PDI was 1.41.

The obtained polymer was put into methanol to precipitate a polymer. The precipitated polymer was subjected to filtration, and the residue was washed with water and then dried sufficiently in a drying machine of 70° C. to purify the polymer. The obtained polymer in a dried state is a bottle-brush consisting of one type of monomer, and this polymer is referred to as PBR-1.

Subsequently, the same reaction apparatus as the one used in Synthesis Example 1 was used, and 200 parts of MDPA as a solvent, 30 parts of the PBR-1 obtained above, 30 parts of BzMA as the monomer of (1), and 0.38 parts of LiCl as the chloride ion-containing compound of (3) were loaded, and a resultant mixture was warmed to 75° C. under nitrogen bubbling. Subsequently, 0.1 parts of succinimide being the compound having an imide group was added as the catalyst of (4), and a resultant mixture was subjected to polymerization for 7 hours. The rate of polymerization was 96.4%, the Mn was 495,400, and the PDI was 1.87 for the obtained polymer. In addition, the molecular weight value by UV was 480,800, and the PDI was 1.93. A peak was hardly obtained for PBR-1 by a UV detector, but UV absorption was remarkably observed for this polymer, and therefore it can be considered that polymerization of the second monomer (BzMA) was initiated from the residual polymerization initiation group and a Janus-type bottlebrush consisting of two types of monomers was obtained.

INDUSTRIAL APPLICABILITY

Regarding examples of utilizing the present invention, a novel polymerization method in which radical polymerization accompanying a termination reaction is initiated and allowed to progress by only using simple, commercially available materials without using a conventional radical polymerization initiator, or a special material or a metal-based catalyst for use in living radical polymerization, and polymers having various structures can thereby be produced industrially and simply is provided, and therefore by utilizing this novel polymerization method, innovative technical development by providing materials to the fields where conventional materials have not been able to be used so far can be expected. Specifically, for example, a polymer material having a peculiar characteristic, such as adhesiveness, a friction property (wear resistance), wettability, a barrier property, or characteristics of adsorption/separation/transportation of a specified substance, and various materials in which the surface of a base material is treated with such a polymer having a peculiar characteristic can be provided, and utilization thereof is expected.

The invention claimed is:

1. A method for producing a polymer, the method comprising polymerizing a radically polymerizable monomer,
   wherein the polymerizing comprises:
   mixing and warming:
   (1) the radically polymerizable monomer having an unsaturated bond;
   (2) an organic compound having at least one group introduced in a molecule thereof, the group functioning as a radical polymerization initiation group for the monomer and having a structure represented by following formula 1;
   (3) at least one chloride ion-containing or at least one bromide ion-containing compound or a combination thereof, selected from the group consisting of lithium chloride, sodium chloride, potassium chloride, calcium chloride, and magnesium chloride each being a metal chloride, lithium bromide, sodium bromide, potassium bromide, and magnesium bromide each being a metal bromide, a quaternary ammonium chloride, a quaternary ammonium bromide, a quaternary phosphonium chloride, and a quaternary phosphonium bromide, and
   (4) a compound having a group selected from the group consisting of an imide group, an N-bromoimide group, and an N-iodoimide group,
   thereby initiating radical polymerization of the monomer (1) from the radical polymerization initiation group having the structure of the formula 1, and
   the radical polymerization accompanies a termination reaction,

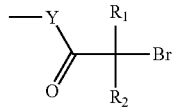
[Formula 1]

wherein $R_1$ represents H, an alkyl group, an acyl group, or an aryl group, $R_2$ represents an alkyl group or an aryl group, and Y represents O or NH.

2. The method for producing a polymer according to claim 1,
   wherein any one of an azo-based radical polymerization initiator, a peroxide-based radical polymerization initiator, and a photo radical polymerization initiator is not present in the polymerizing of the radically polymerizable monomer.

3. The method for producing a polymer according to claim 1,
   wherein an organic solvent is further present in the polymerizing of the radically polymerizable monomer.

4. The method for producing a polymer according to claim 3,
   wherein the organic solvent is at least one solvent selected from the group consisting of an alcohol-based solvent, a glycol-based solvent, an amide-based solvent, a urea-based solvent, a sulfoxide-based solvent, and an ionic liquid.

5. The method for producing a polymer according to claim 1,
   wherein (1) the radically polymerizable monomer having an unsaturated bond is a methacrylic acid-based monomer.

6. The method for producing a polymer according to claim 1,
   wherein the group having the structure represented by the formula 1 is a group having a structure represented by following formula 2:

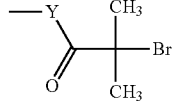
[Formula 2]

wherein Y represents O or NH.

* * * * *